United States Patent [19]
Abe et al.

[11] Patent Number: 5,376,467
[45] Date of Patent: Dec. 27, 1994

[54] ORGANIC ELECTROLYTE BATTERY

[75] Inventors: Takao Abe; Naoyuki Sugeno; Keiji Shionuma, all of Fukushima, Japan

[73] Assignee: Sony Corporation, Tokyo, Japan

[21] Appl. No.: 26,029

[22] Filed: Mar. 4, 1993

[30] Foreign Application Priority Data

Mar. 26, 1992 [JP] Japan .................. 4-084903

[51] Int. Cl.$^5$ .................. H01M 2/04; H01M 2/02
[52] U.S. Cl. .................. 429/7; 429/163; 429/185; 429/71
[58] Field of Search .............. 429/163, 171, 185, 164, 429/166, 7, 71

[56] References Cited
U.S. PATENT DOCUMENTS

| | | | |
|---|---|---|---|
| 3,907,588 | 9/1975 | Begum | 429/7 |
| 4,035,552 | 7/1977 | Epstein | 429/58 |
| 4,943,497 | 7/1990 | Oishi et al. | 429/54 |
| 4,999,264 | 3/1991 | Shepard, Jr. et al. | 429/171 |

FOREIGN PATENT DOCUMENTS 3476 1/1984 Japan.
191273 10/1984 Japan.

OTHER PUBLICATIONS

Chem. Ab., JP58-188066, vol. 8 No. 25, Feb. 1984.
Research Disclosure, Havant Hampshire, GB.

*Primary Examiner*—Kathryn Gorgos
*Attorney, Agent, or Firm*—Hill, Steadman & Simpson

[57] ABSTRACT

An organic electrolyte battery has a positive temperature coefficient resistor made of a resin to control and prevent overcurrent placed in electrical contact with both a sealing member of the battery can and a battery lid in a position where it is not subjected to crimping forces when the battery can is crimped onto the sealing member to close the battery can. In one embodiment, the resistor is carried on an annular member so that it is spaced inward from a crimping zone. In a second embodiment, it is disposed in the center of the lid and connected to the sealing member by a support member.

5 Claims, 3 Drawing Sheets

ORGANIC ELECTROLYTE BATTERY

BACKGROUND OF THE INVENTION

1. Field of the Invention

The present invention relates to an organic electrolyte battery which is provided with an internal safety switch to protect the battery from overcurrent, which lead to the damage or the disruption of the battery seal and the anomalous temperature rise.

2. Description of the Prior Art

One of the high density energy batteries now in use is the organic electrolyte battery in which the anode active material is metallic lithium or a carbonaceous material (such as coke) capable of doping and dedoping lithium and the electrolyte is an organic solvent. Unfortunately, it suffers a disadvantage of heating up (higher than 200° C.) due to overcurrent resulting from forced discharge or external short-circuit. The consequence of heating up is the evaporation or decomposition of the organic electrolyte (organic solvent) which breaks or bursts the battery.

For protection of the organic electrolyte battery from overcurrent and heating up, there have been proposed several kinds of internal safety switches. For example, Japanese Patent Laid-open No. 191273/1984 discloses a battery provided with a terminal conductor made of a shape memory alloy which cuts off the battery current when the battery temperature rises. U.S. Pat. No. 4,035,552 discloses a battery provided with two metal plates of different materials between the battery cover and casing which plates function as a switch responding to heat and pressure. There is another known way of controlling and preventing overcurrent by means of a PTC resin resistor which rapidly increases in resistance, thereby cutting off current, when the temperature reaches a certain threshold value. (PTC stands for positive temperature coefficient.)

In practice, the PTC resistor is interposed between the electrode (the battery casing seal) and the terminal cap, as disclosed in Japanese Utility Model Laid-open No. 3476/1984. An organic electrolyte battery provided with a PTC resistor is shown in section in FIG. 3. It is a secondary battery of cylindrical shape made up of an electrode assembly, an electrolyte, and a battery can 4 containing them. The electrode assembly consists of a long cathode 1 (having a lithium compound as the active material) and a long anode 2 (having a carbonaceous material as the active material) which are wound with a separator 3 interposed between them. The cathode 1 is connected to a sealing member 6 through a lead wire 5. Above the sealing member 6 is placed a vent-holed battery lid 8, with a PTC resistor 7 interposed between the lid 8 and member 6. The anode 2 is connected to the battery can 4. The battery is sealed by crimping the open end of the battery can 4 in such a manner as to enclose the edges of the sealing member 6, PTC resistor 7, and battery lid 8, with an insulating gasket 9 interposed between them.

The battery constructed as mentioned above controls itself according to its temperature. When the temperature reaches a certain threshold value, the PTC resistor 7 rapidly increases in resistance, thereby reducing the flow of current in the battery. This protects the battery from overheating (and its resulting pressure increase) due to overcurrent and, hence, prevents the leakage and bursting of the battery. When the temperature goes down below the threshold value, the PTC resistor 7 decreases in resistance accordingly, restoring the battery to its normal state. Incidentally, to ensure the safety of the battery in case the PTC resistor 7 does not work as intended, the battery has a safety valve in the sealing member or sealer 6 which opens to break the lead wire 5 and permits gas to discharge through the vent hole in the battery lid when the temperature in the battery anomalously increases.

A disadvantage of the conventional organic electrolyte battery provided with a PTC resistor to control and prevent overcurrent is that the open end of the battery can 4 cannot be crimped tightly because the mechanically weak PTC resistor is broken by tight crimping. Loose crimping is liable to cause the leakage of electrolyte from the seal when the seal is deformed by a temperature rise. Moreover, the PTC and battery lid are subject to corrosion at their contact, which is unfavorable to battery storage over a long period of time.

SUMMARY OF THE INVENTION

The present invention was completed to address the above-mentioned problems. It is an object of the present invention to provide a reliable organic electrolyte battery with a PTC resistor to control and prevent overcurrent which is tightly sealed to prevent the leakage of electrolyte and the corrosion at the contact between the PTC resistor and the battery lid.

DESCRIPTION OF THE PREFERRED EMBODIMENTS

Figure 1:
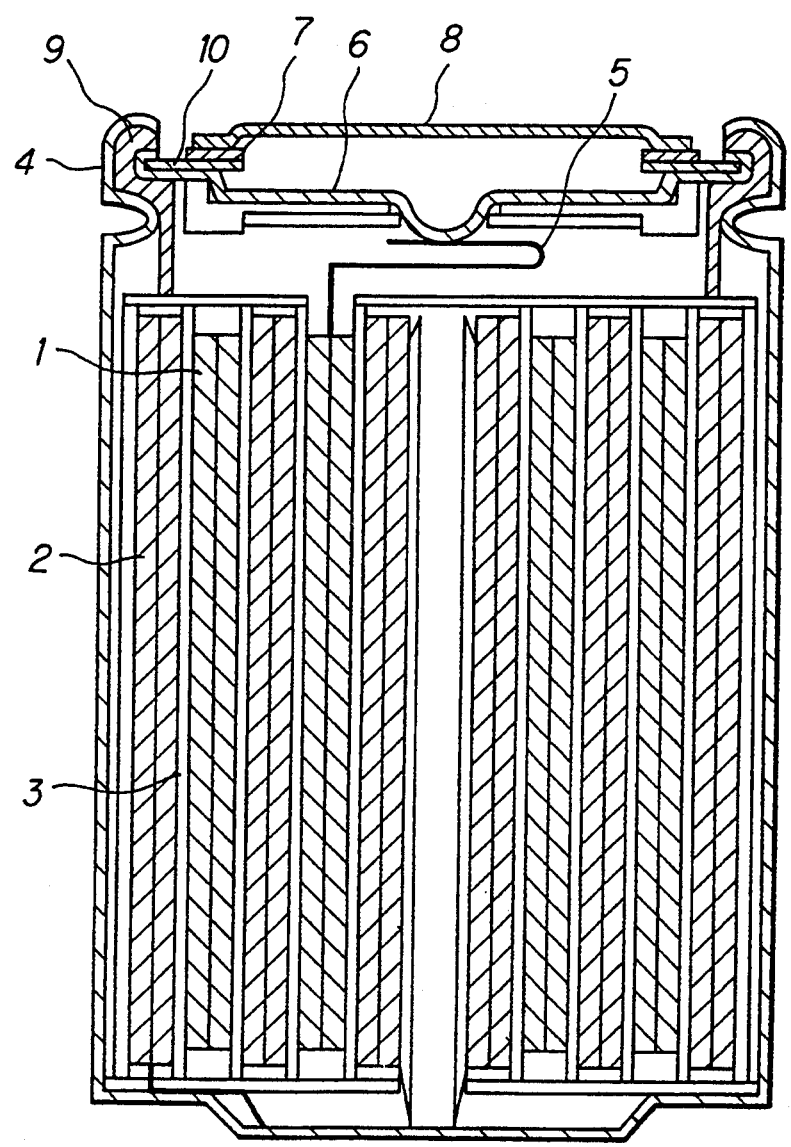
FIG. 1 is a sectional view of a battery in an embodiment of the present invention.

The above-mentioned object of the present invention is achieved by an improved organic electrolyte battery of the type having a battery can accommodating a cathode and an anode, a sealing member to seal said battery can as the open end of said battery can is crimped with an insulating gasket placed inside, and a vent-holed battery lid arranged on said sealing member, wherein the improvement comprises a positive temperature coefficient resistor made of resin which is interposed between said sealing member and said battery lid in such a manner that it is not crimped when said battery can is crimped.

The feature of the present invention resides in the PTC resistor as a means to control and prevent overcurrent which is interposed between said sealing member and said battery lid in such a manner that it is not crimped when said battery can is sealed by crimping the sealing member. This sealing structure may be established by arranging the PTC resistor on the inside periphery of the battery lid, arranging a seal supporting metal plate between the PTC resistor and the sealing member, and crimping the battery can together with the seal supporting metal plate and the sealing member. Another way of establishing the sealing structure is by arranging the PTC resistor at the center of the inside of the battery can, arranging an insulator inside the periphery of the battery lid, arranging a seal supporting metal plate on the insulator and PTC resistor, and crimping the end of the battery can together with the battery lid, insulator, seal supporting metal plate, and sealing member. This sealing structure provides a large contact area between the PTC resistor and the battery lid and between the PTC resistor and the seal supporting metal plate. The large contact area is desirable from the standpoint of reducing the internal resistance of the battery which would increase by the incorporation of the PTC resistor.

The organic electrolyte battery of the present invention has a part in which the battery lid, PTC resistor, and seal supporting metal plate are laminated on top of the other. It is desirable to previously bond the PTC resistor to the battery lid so that the PTC resistor is incorporated into the battery accurately and easily. This improves the productivity of the battery. The bonding of the PTC resistor to the battery lid may be accomplished by several ways so long as sufficient conductivity is maintained during charging and discharging and the PTC resistor is kept in position. The bonding method may be by solder welding, resistance welding, ultrasonic welding, laser welding, electron beam welding, and bonding with a conductive adhesive. Bonding with a conductive adhesive is desirable because it is important to protect the PTC resistor from heat. Bonding by solder welding should be finished in short time.

The organic electrolyte battery of the present invention may have the same construction as the conventional one so long as the PTC resistor is not crimped together with the battery can when the battery can is sealed by crimping the sealing member. The sealing member of the battery may be provided with a safety valve which opens when the internal pressure of the battery increases due to anomalous temperature rise.

The organic electrolyte battery of the present invention has the PTC resistor interposed between the sealing member and the battery lid, so that the PTC resistor controls and prevents overcurrent that might occur in the battery. Since the PTC resistor is arranged such that it is not crimped together with the battery can, it is possible to seal the battery can by tightly crimping its sealing part. The tight crimping prevents the electrolyte from leaking even when the sealing part is deformed by heat locally evolved in the battery. The tight crimping also protects the contact part between the PTC resistor and the battery lid from corrosion, which improves the reliability of the battery.

EXAMPLES

The invention will be described in more detail with reference to the following examples.

Example 1

An organic electrolyte secondary battery of cylindrical shape (20 mm in outside diameter and 50 mm in height), as shown in FIG. 1, was produced which is made up of a battery can 4 and an electrode assembly and an electrolyte sealed therein, said electrode assembly being composed of a long cathode 1 and a long anode 2 wound with a separator 3 interposed between them.

The long cathode 1 was prepared by coating aluminum foil with an admixture of $LiCoO_2$, graphite, binder, and dispersing agent, followed by drying, pressure molding, and cutting to a desired length and width. The long anode 2 was prepared by coating copper foil with an admixture of heat-treated coke (as a carbonaceous material), binder, and dispersing agent, followed by drying, pressure molding, and cutting to a desired length and width.

The battery sealing was accomplished as follows: First, an assembly was made from a vent-holed battery lid 8, an annular PTC resistor 7 (16 mm in outside diameter and 8 mm in inside diameter, for example a positive temperature coefficient resin resistor sold under the trademark POLYSWITCH by Raychem Co., Ltd.), and a seal supporting metal plate 10 of aluminum, which are concentrically arranged in a stack and bonded together by solder welding. Then, the assembly was placed on a sealing member 6 connected to the cathode 1 through a lead wire 5. Finally, the edge of the battery can 4 and the sealing member 6 were crimped together, with an insulating gasket 9 interposed between them, such that the crimping encloses the edge of the seal supporting metal plate 10.

The seal supporting metal plate 10 is not specifically limited so long as it is a conducting metal plate which can be firmly bonded to the PTC resistor 7 and tightly crimped together with the sealing member 6 for the battery sealing. It includes, for example, an aluminum plate, a nickel plate, an iron plate, a copper plate, and a stainless steel plate.

The sealing member 6 has a safety cover which bursts and opens to ensure safety in case the pressure in the battery increases due to anomalous temperature rise.

The battery thus prepared was tested for discharge capacity by repeating the cycle of charging and discharging 10 times at room temperature. Charging was continued until the end voltage reached 4.1 V with a charge current of 500 mA, and discharging was continued until the end voltage reached 2.5 V with a discharge resistance of 6 $\Omega$. The discharge capacity in the tenth cycle was 950 mAh, and that in the eleventh cycle (after discharging at 2.5 A) was 850 mAh.

The battery was also tested in a thermostatic bath at 60° C. for discharge capacity at a discharge current of 2.5 A. The discharge capacity was 905 mAh.

The battery underwent the overcharge test which consists of charging at 4.5 V and discharging through a shorted external circuit. The battery reached its maximum temperature of 108° C. within 5.5 minutes. The battery remained normal without the leakage of electrolyte and gas from the seal.

Example 2

The same organic electrolyte secondary battery (shown in FIG. 1) as in Example 1 was prepared except that an electrically conductive adhesive was used to bond the battery can lid 8, the PTC resistor 7, and the seal supporting metal plate 10 to one another. A sufficient bond strength as high as 4 kg/cm$^2$ was attained.

The battery thus prepared underwent the charge-discharge test in the same manner as in Example 1. The discharge capacity at a discharge resistance of 6 $\Omega$ and at a discharge current of 2.5 A was 945 mAh and 840 mAh, respectively, after the tenth cycle at room temperature. The discharge capacity at a discharge current of 2.5 A was 900 mAh at 60° C. The electrically conductive adhesive remained intact.

The battery underwent the overcharge test which consists of charging at 4.5 V and discharging through a shorted external circuit. The battery reached its maximum temperature of 107° C. within 5.4 minutes. The battery remained normal without the leakage of electrolyte and gas from the seal.

Example 3

Figure 2:
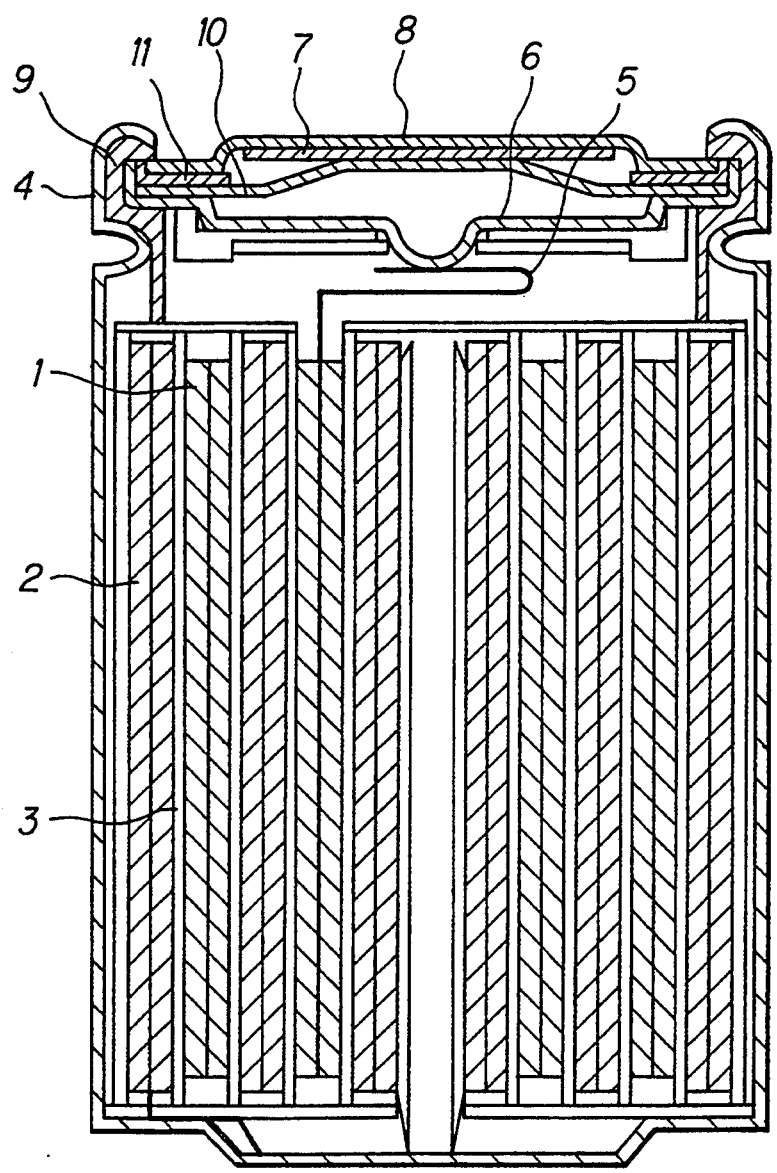
FIG. 2 is a sectional view of a battery in another embodiment of the present invention.

The same organic electrolyte secondary battery as in Example 1 was prepared except that sealing was accomplished as follows. (Refer to FIG. 2.) First, an assembly was made from a vent-holed battery lid 8, a round PTC resistor 7, an annular insulator 11, and a seal supporting metal plate 10, which are concentrically arranged in this order in a stack and bonded together. Then, the assembly was placed on a sealing member 6 connected to the cathode 1 through a lead wire 5. Finally, the edge of the battery can 4 and the sealing member 6 were crimped together, with an insulating gasket 9 interposed between them, such that the crimping encloses the edges of the seal supporting metal plate 10 and the insulator 11.

The battery thus prepared underwent the charge-discharge charge test in the same manner as in Example 1. The discharge capacity at a discharge resistance of 6 Ω and at a discharge current of 2.5 A was 950 mAh and 940 mAh, respectively, after the tenth cycle at room temperature. The discharge capacity at a discharge current of 2.5 A was 900 mAh at 60° C. The battery underwent the overcharge test which consists of charging at 4.5 V and discharging through a shorted external circuit. The battery reached its maximum temperature of 107° C. within 6.1 minutes. The battery remained normal without the leakage of electrolyte and gas from the seal.

Comparative Example 1

Figure 3:
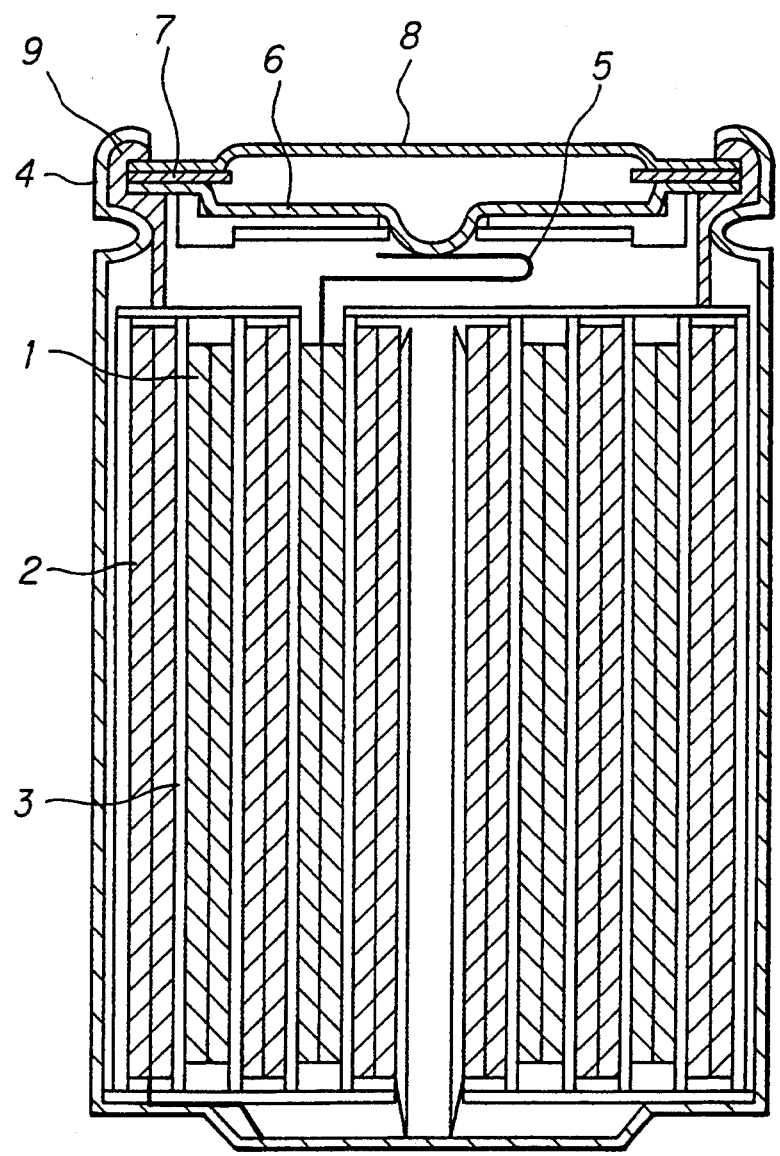
FIG. 3 is a sectional view of a conventional battery.

The same organic electrolyte secondary battery as in Example 1 was prepared except that sealing was constructed as shown in FIG. 3. The battery thus prepared underwent the charge-discharge test. The discharge capacity at a discharge resistance of 6 Ω and at a discharge current of 2.5 A was 960 mAh and 870 mAh, respectively, after the tenth cycle at room temperature. The discharge capacity at a discharge current of 2.5 A was 910 mAh at 60° C. The battery underwent the overcharge test which consists of charging at 4.5 V and discharging through a shorted external circuit. The battery reached its maximum temperature of 110° C. within 5.1 minutes. The battery suffered the leakage of electrolyte from the seal.

Comparative Example 2

The same organic electrolyte secondary battery as in Comparative Example 1 was prepared except that the PTC resistor was not used. The battery thus prepared underwent the charge-discharge test. The discharge capacity at a discharge resistance of 6 Ω and at a discharge current of 2.5 A was 960 mAh and 875 mAh, respectively, after the tenth cycle at room temperature. The discharge capacity at a discharge current of 2.5 A was 910 mAh at 60° C. The battery underwent the overcharge test which consists of charging at 4.5 V and discharging through a shorted external circuit. The battery reached its maximum temperature higher than 200° C. within 1.5 minutes. The battery suffered the leakage of electrolyte and gas from the seal.

The above-mentioned examples and comparative examples demonstrate the effectiveness of the PTC resistor. That is, the battery in Comparative Example 1, which is provided with the PTC resistor but is sealed by crimping the PTC resistor, and the battery in Comparative Example 2, which is not provided with the PTC resistor, are comparable to those in Examples 1 to 3 in discharge capacity under the normal use conditions, whereas they suffer the leakage of electrolyte and gas under the overcharge conditions. The fact that the battery in Comparative Example 2, which is not provided with the PTC resistor, is comparable to those in Examples 1 to 3 in discharge capacity, suggests that the PTC resistor decreases only slightly the discharge capacity due to increase in the internal resistance of the battery.

Although the invention has been described in its preferred form, it is believed obvious that modification and variation of the invention are possible in light of the above teachings. The invention may also be applied to organic electrolyte primary batteries.

According to the present invention, the battery is provided with a PTC resistor to control and prevent over-current and is constructed to permit tight sealing, so that the battery is free from leakage and corrosion at the contact between the PTC resistor and the battery lid. This leads to the improved reliability of the battery.

What is claimed is:

1. In an organic electrolyte battery having a battery can with an open end, said can accommodating a cathode and an anode, a sealing member to seal said battery can as the open end of said battery can is crimped with an insulating gasket placed inside, said sealing member having a safety valve, and a vent-holed battery lid arranged on said sealing member, wherein the improvements comprise a seal supporting metal plate crimped with the sealing member by the open end of said battery can, and a positive temperature coefficient resistor made of resin interposed between said seal supporting metal plate and the battery lid and in contact therewith without being crimped when said battery can is crimped.

2. In an organic electrolyte battery according to claim 1, wherein the resistor is arranged on the center of the inside of the battery lid, an insulator is arranged on the inside periphery of the battery lid, said seal supporting metal plate is interposed between the insulator and the sealing member, and the battery lid, the insulator, the seal supporting metal plate, and the sealing member are crimped with the battery can.

3. In an organic electrolyte battery according to claim 2, wherein the resistor is bonded to the inside of the battery lid with an electrically conductive adhesive.

4. In an organic electrolyte battery according to claim 1, wherein the resistor is arranged on the inside periphery of the battery lid, said seal supporting metal plate has a shape of an annular member and is interposed between the resistor and the sealing member.

5. In an organic electrolyte battery according to claim 4, wherein the resistor is bonded to the inside of the battery lid with an electrically conductive adhesive.

* * * * *